May 31, 1949.  N. E. BROOKE  2,471,720
WEED SLASHER
Filed July 13, 1945
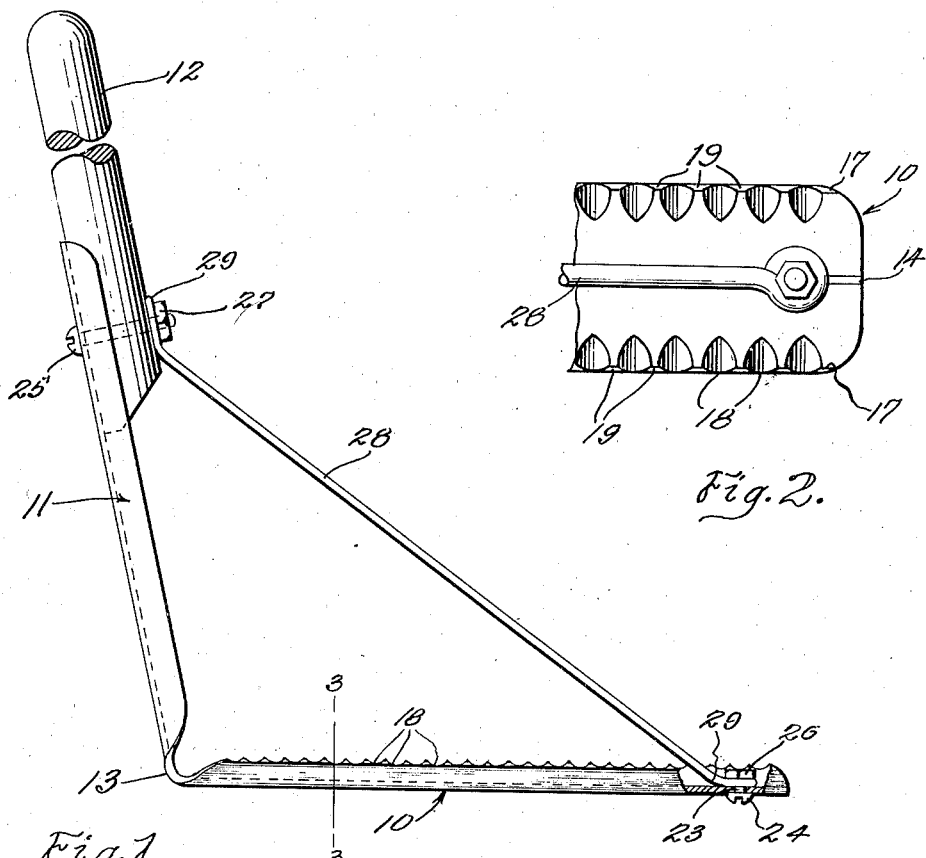
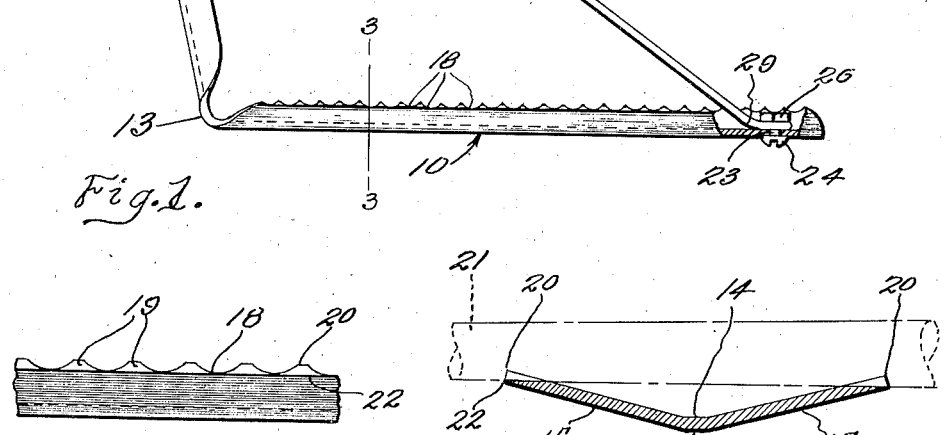
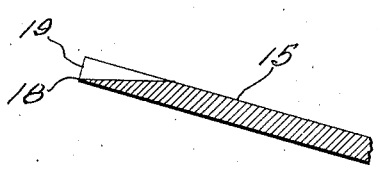
Inventor
Norman E. Brooke
By Wilfred E. Lawson
Attorney Patented May 31, 1949

2,471,720

UNITED STATES PATENT OFFICE 2,471,720

WEED SLASHER

Norman E. Brooke, Washington, D. C.

Application July 13, 1945, Serial No. 604,836

2 Claims. (Cl. 30—318)

This invention relates generally to improvements in gardening tools or implements and pertains particularly to an improved type of weed cutter or weed slasher.

The weed cutting device of the present invention belongs to that class or type of tool or implement which the user swings back and forth in front of him in much the same way that a golf club is swung, for the purpose of cutting grass and weeds. Various types of such weed cutters or slashers have been devised but in all types the cutting edge or cutting portions of the device are so exposed as to be readily damaged in the event that such edge strikes a rock, stone, piece of metal or other hard substance, as a result of which the implement soon becomes dulled and useless.

A principal object of the present invention is to provide a weed cutter or slasher of the above described type wherein the cutting edge is made up of a plurality of short sharpened or cutting portions, separated by flat or unsharpened portions which are set forwardly of the sharpened portions so that if the cutting edge of the implement strikes a stone or other object which would tend to damage the metal, such damage is taken by the unsharpened portions of the blade and the cutting edges or portions remains undamaged.

Another object of the invention is to provide a weed cutter of the above described type wherein the working edge of the cutting blade is formed to provide a series of short cutting portions for the purpose stated, the blade being constructed in such a manner that such cutting portions may be easily and quickly formed or resharpened as required, by the disposition of a cutting element such as a round file or the like, transversely of the blade in such a way as to form, cut or sharpen simultaneously two oppositely located cutting portions.

Another object of the invention is to provide a weed slasher of the character stated which is so designed that in the operation of forming or sharpening two oppositely positioned cutting portions the necessary or desired unsharpened areas will be formed between the sharpened portions along each edge of the blade.

Still another object of the invention is to provide an implement of the character stated which is designed so that it may be constructed of relatively light sheet metal and at the same time have a requisite amount of strength or rigidity by reason of the employment of a bracing bar or rod between opposite extremities of the tool, such bracing rod further acting to function as a deflector means by which the movement of the cut vegetation laterally from the path of cut, is affected.

The invention will be best understood from a consideration of the following detailed description taken in connection with the accompanying drawing forming a part of the specification, with the understanding, however, that the invention is not to be understood as limited to the exact details of construction shown and described since obvious modifications will occur to a person skilled in the art.

In the drawing:

Figure 1 is a view in side elevation of a weed slasher constructed in accordance with the present invention, portions of the same being broken away.

Figure 2 is a view in top plan, full scale, of the outer end of the slashed blade.

Figure 3 is a transverse section of the blade, taken approximately on line 3—3 of Figure 1 and on an enlarged scale, illustrating the use of a sharpening file.

Figure 4 is a view on an enlarged scale, of a portion of an edge of the blade.

Figure 5 is a greatly enlarged portion, in transverse section, of the blade, the section line corresponding to that for Figure 3.

Referring now more particularly to the drawing the numeral 10 generally designates the portion of the implement which will be referred to broadly as the blade, while the numeral 11 designates the shank of the blade which is substantially semi-circular in cross section and designed to receive a portion of one end of the handle 12 which is formed of round wood stock.

The blade and shank are formed from a single piece of sheet metal of suitable length and width. Such a piece of metal initially may be of the same width throughout its length and is bent transversely at 13 to form the heel of the blade. From the heel the shank portion 11 is formed to have the desired semi-circular cross sectional form while the remaining portion of the material from which the blade 10 is formed is pressed along the central longitudinal line 14 to give to the blade a cross sectional design in the form of a wide V as shown in Figure 3. Thus the blade is shaped to have the two long flat portions 15 which at their convergent sides form the central bottom ridge or rib 16 while the free or outer longitudinal edges are in a plane slightly above the ridge 16 and in a common plane one with the other.

Each of the longitudinal edges 17 of the blade is formed to have a series of short concave cutting edges 18. These cutting edges are separated by the flat edge portions 19 of the blade body. Thus it will be seen that while the short arcuate cutting edges 18 may be brought into contact with the stems of weeds or grasses, if the edge of the blade should strike against a stone or other hard object the guard surfaces between the sharpened cutting portions 18 will be the part of the blade to contact the object and the sharpened portions will be protected from damage.

The sharpened cutting edge portions 18 are initially formed or may be sharpened when required, in a novel manner and such novel manner of sharpening or forming the cutting portions 18 facilitates the forming or sharpening of two oppositely positioned portions at a time and at the same time results in the formation of the guard or buffer faces or surfaces 19.

Figure 3 illustrates the manner of forming, or of sharpening, two oppositely located cutting edge portions 18. As will be readily apparent, because of the angular disposition of the two portions 15 of the blade, the top corners 20 of the outside or free longitudinal edges are brought into a common plane and, as previously stated, a suitable cutting tool such as a round or rat tail file, illustrated in broken lines and designated 21, is then disposed transversely of the blade for simultaneous contact with the top corners 20 and the material of the edges of the blade portions is then filed or cut away until the line of cut passes through the lower corners 22 of the blade edges. The cutting may be terminated in this line or it may be carried slightly below the line in which latter case the sharpness of the cutting portion 18 will be extended throughout the arc or curvature of such portion.

Adjacent to the outer or free end of the blade 10 an aperture 23 is formed to receive a securing bolt 24 and a corresponding bolt 25 is passed through the upper end portion of the shank 11 and through the handle 12. The bolt 24 carries the securing nut 26 while the bolt 25 carries the nut 27.

Extending between the bolts 24 and 25 is a brace rod 28, the ends of which are formed to provide the eyes 29 through which the bolts pass. This brace rod holds the outer end of the blade 10 against bending movement across the heel 13 and while it is preferred that it be secured to the blade in the manner illustrated it is to be understood that the invention is not limited to this specific construction since it will be readily obvious that the rod may be riveted or welded to the blade if desired.

Since the blade 10 and shank with the attached handle are fixed or held in an obtusely angled relation it will be readily apparent that the underside or sole of the blade 10 may be rested flat upon the ground and the upper end of the handle 12 grasped and held in the hand without strain so that the blade can be swung back and forth in parallel relation with the surface of the ground to effectively cut weeds and grasses.

In using the weed slasher in this manner, as the weeds are cut they fall across the downwardly and forwardly inclined brace bar 28 and slide outwardly from the lower end of the bar so as to be effectively removed from the path of operation.

It will also be readily apparent that because of the angular form of the blade 10 the possibility of driving the edges of the blade into the ground is extremely remote because of the fact that as the blade is swung down the advancing edge will be starting to rise through the arc of swing before the blade has reached the bottom of such arc or in other words before the center of the blade which is defined by the rib 16, has reached such position. Because of this formation and because of the provision of the flat guard faces 19 between the sharpened cutting portions 18 it will be readily apparent that the possibility of damaging the cutting portions or short arcuate knives which make up each longitudinal edge of the blade, is extremely remote.

I claim:

1. A weed cutter or slasher, comprising a relatively long blade body of flattened V cross section, a handle attached thereto, the top corners of the longitudinal edges of the body being cut away transversely at closely spaced positions therealong to form a series of sharpened concave cutting edges, the material of the body between said cutting edges presenting flat striking faces designed to guard the cutting portions.

2. A weed slasher of the character stated in claim 1, in which said handle is secured to one end of the blade body to form an obtuse angle therewith, and means connected between the handle and the free end of the blade body and overlying the full length of the body for preventing cut vegetation from falling across the blade body.

NORMAN E. BROOKE.

REFERENCES CITED

The following references are of record in the file of this patent:

UNITED STATES PATENTS

| Number | Name | Date |
|---|---|---|
| 688,529 | Kretsinger | Dec. 10, 1901 |
| 1,045,218 | Timmons | Nov. 26, 1912 |
| 2,151,577 | Withington | Mar. 21, 1939 |
| 2,283,322 | Edell | May 19, 1942 |
| 2,400,284 | Brooke | May 14, 1946 |